United States Patent
Rajan et al.

(10) Patent No.: US 10,702,046 B2
(45) Date of Patent: Jul. 7, 2020

(54) SQUEEZABLE HYBRID WATER BOTTLE WITH INTEGRATED FILTER AND METHOD OF FORMING THE SAME

(71) Applicant: Aqua Fix USA, Inc., Tustin, CA (US)

(72) Inventors: Pasupathicoil Ramaswamy Soundar Rajan, Tustin, CA (US); Sowmya Soundar Rajan, Tustin, CA (US)

(73) Assignee: Aqua Fix USA, Inc., Tustin, CA (US)

( * ) Notice: Subject to any disclaimer, the term of this patent is extended or adjusted under 35 U.S.C. 154(b) by 168 days.

(21) Appl. No.: 15/809,897

(22) Filed: Nov. 10, 2017

(65) Prior Publication Data

US 2019/0142144 A1     May 16, 2019

(51) Int. Cl.
   *C02F 1/44*          (2006.01)
   *A45F 3/20*          (2006.01)
   (Continued)

(52) U.S. Cl.
   CPC ............ *A45F 3/20* (2013.01); *B01D 15/00* (2013.01); *B65D 35/10* (2013.01); *B65D 35/44* (2013.01);
   (Continued)

(58) Field of Classification Search
CPC .......... C02F 1/003; C02F 1/283; C02F 1/442; C02F 2307/02; B01D 15/00; B01D 63/067; A45F 3/20; A45F 2003/163; B65D 11/04; B65D 15/16; B65D 23/00; B65D 35/10; B65D 35/44
See application file for complete search history.

(56) References Cited

U.S. PATENT DOCUMENTS 2,781,312 A    2/1957   Klumb et al.
3,430,769 A    3/1969   Sanzenbacher
(Continued)

FOREIGN PATENT DOCUMENTS

DE     202011101644 U1 * 11/2011  ............... A45F 3/20
EP       2 165 941        3/2010
(Continued)

OTHER PUBLICATIONS

Patent Cooperation Treaty, International Search Report and Written Opinion for International Application No. PCT/US18/58233, Jan. 18, 2019, 11 pages.

*Primary Examiner* — Matthew O Savage
(74) *Attorney, Agent, or Firm* — Stetina, Brunda, Garred and Brucker

(57) ABSTRACT

A method of forming a hybrid, hand-held drinking bottle includes connecting a top element to a bottom element to form a seam therebetween. The top element includes a top wall extending around a top axis, and a top opening extending within the top element between opposed ends of the top wall. The top element is formed from a material that is of a first hardness. The bottom element comprises an end wall, a bottom wall extending around a bottom axis, and a bottom opening extending between the end wall and an opposing end of the bottom wall. The bottom element is formed from a material that is of a second hardness less than the first hardness. The top opening is in communication with the bottom opening when the top element is connected to the bottom element. The method further includes over molding a collar around the seam.

20 Claims, 5 Drawing Sheets

(51) Int. Cl.
   *C02F 1/28* (2006.01)
   *B01D 15/00* (2006.01)
   *B65D 35/10* (2006.01)
   *B65D 35/44* (2006.01)
   *C02F 1/00* (2006.01)
   *A45F 3/16* (2006.01)

(52) U.S. Cl.
   CPC .............. *C02F 1/003* (2013.01); *C02F 1/283* (2013.01); *C02F 1/442* (2013.01); *A45F 2003/163* (2013.01); *C02F 2307/02* (2013.01)

(56) References Cited

U.S. PATENT DOCUMENTS

| | | | |
|---|---|---|---|
| 3,872,013 A | 3/1975 | Nishino | |
| 4,940,542 A | 7/1990 | Simizu et al. | |
| 5,094,363 A | 3/1992 | Monahan et al. | |
| 5,167,819 A | 12/1992 | Iana et al. | |
| 5,527,451 A | 6/1996 | Hembree | |
| 5,545,315 A | 8/1996 | Lonneman | |
| 5,681,463 A * | 10/1997 | Shimizu | B01D 61/18 210/266 |
| 5,733,448 A | 3/1998 | Kaura | |
| 5,830,360 A | 11/1998 | Mozayeni | |
| 6,136,188 A | 10/2000 | Rajan et al. | |
| 6,387,260 B1 | 5/2002 | Pimenov | |
| 6,550,622 B2 * | 4/2003 | Koslow | B01D 39/1623 210/489 |
| 7,670,479 B2 | 3/2010 | Arett | |
| 8,182,683 B1 * | 5/2012 | Allen | C02F 1/003 210/244 |
| 9,670,076 B2 | 6/2017 | Rajan et al. | |
| 2004/0134871 A1 | 7/2004 | Yaita | |
| 2006/0066698 A1 | 3/2006 | Takatsuka | |
| 2007/0170049 A1 | 7/2007 | Mansur | |
| 2008/0087596 A1 | 4/2008 | Bommi | |
| 2008/0110820 A1 | 5/2008 | Knipmeyer | |
| 2009/0090661 A1 | 4/2009 | Tanner | |
| 2014/0175005 A1 | 6/2014 | Bradford | |
| 2015/0041383 A1 | 2/2015 | Pritchard | |
| 2015/0284260 A1 | 10/2015 | Huda | |
| 2015/0321793 A1 | 11/2015 | Oved et al. | |
| 2016/0200598 A1 | 7/2016 | Rajan | |
| 2017/0283137 A1 * | 10/2017 | Jiang | B65D 51/1616 |

FOREIGN PATENT DOCUMENTS

| | | | |
|---|---|---|---|
| WO | WO-2012007937 A1 * | 1/2012 | ............... A45F 3/20 |
| WO | WO 2012/051356 | 4/2012 | |

* cited by examiner

SQUEEZABLE HYBRID WATER BOTTLE WITH INTEGRATED FILTER AND METHOD OF FORMING THE SAME

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a water bottle, and more specifically, to a water bottle having internal filtration capabilities, and a hybrid body formed from two different materials, with one material being softer and more flexible than the other.

2. Description of the Related Art

It is well known that drinking water is critical to maintaining good health. Thus, access to clean, potable water makes it easier to maintain good health. However, access to clean water may be a luxury not everyone enjoys. In particular, some geographic regions have limited access to potable water. Furthermore, even those who may regularly have access to clean water in the home may engage in certain activities, such as camping, hiking or other athletic activities, where clean water may not be readily available. It may become equally essential when one travels overseas, where the quality of potable water for drinking may be questionable.

In view of the need to have access to water in remote areas, or to allow for more convenient access, single use bottles having filtered water are commonly used in such circumstances. In this regard, such single use water bottles have grown in popularity in recent years, with such water bottles typically being sold in large packages, e.g., packages of 24 or 36 bottles. Thus, the packages may be deployed to areas of need, or may be purchased by an individual, and the bottles within the package may be grabbed and consumed as needed.

Although single use water bottles may enhance access to clean, potable water, the widespread use of such water bottles has resulted in a negative impact on the environment. Along these lines, many single use water bottles are formed from polyethylene terephthalate (PETE), which typically contains a certain amount of a harmful chemical, known as BPA (i.e., Bisphenol A), used as an additive to strengthen the PETE material. Discarding of empty PETE drinking water bottles or similar bottles in the environment has caused major environmental pollution and created danger not only to humans, but also to marine life in rivers, streams, lakes, and oceans. It has been estimated that the volume of throwaway single use bottles, in particular, drinking water bottles, exceeds 140 billion bottles per year. Furthermore, it has been estimated that in 2010, eight million tons of plastic trash ended up at the bottom of the ocean from coastal countries. By 2025, it is projected that 155 million tons of plastic trash will reach the oceans' floors.

Accordingly, there is a need in the art for a reusable water bottle that provides filtration capabilities. Various aspects of the present disclosure address this particular need, as will be discussed in more detail below.

BRIEF SUMMARY

Currently, there are a few drinking water bottles with a built-in filter available on the market, although a common drawback with such currently available bottles is that they are very hard to squeeze to generate sufficient internal pressure to force water through the filter media. Such squeezable filtration units have received negative reviews becomes the homogeneous plastic material commonly used in such units is "hard to squeeze," causing frustration to the users.

In accordance with one embodiment of the present disclosure, there is provided a hybrid, squeezable, water filter bottle, and method of forming the same, having internal filtration capabilities, which addresses the deficiencies noted above in relation to the "hard to squeeze" bottles. In this regard, the water filter bottle may be formed of two different materials, with a harder material being used to provide structural support, such as for an internal filter, while a softer, more flexible material may be used to facilitate ease of squeezing of the water filter bottle by the user for generating internal pressure to force water through the filter, and in turn, dispensing filtered water to the user.

According to one embodiment, there is provided a method of forming a hand-held drinking bottle. The method comprises connecting a top element to a bottom element to form a seam therebetween. The top element includes a top wall extending around a top axis, and a top opening extending within the top element between opposed ends of the top wall. The top element is formed from a material that is of a first hardness. The bottom element comprises an end wall, a bottom wall extending around a bottom axis, and a bottom opening extending between the end wall and an opposing end of the bottom wall. The bottom element is formed from a material that is of a second hardness less than the first hardness. The top opening is in communication with the bottom opening when the top element is connected to the bottom element so as to form a reservoir for retaining a liquid. The method further includes over molding a collar around the seam, the collar being bonded to both the top element and the bottom element.

The connecting step may include connecting the top element to the bottom element via snap fit engagement. The connecting step may include connecting the top element to the bottom element via threaded engagement.

The over molding step may result in a portion of the collar melding with the top element. The over molding step may result in a portion of the collar melding with the bottom element. The over molding step may result in the collar melding with the top element and the bottom element.

The method may further comprise the step of placing a filter within the reservoir. The method may include the step of connecting a filter to the top element, with at least a portion of the filter residing within the reservoir.

According to yet another embodiment, there is provided a hand squeezable drink bottle comprising a top element including a top wall extending around a top axis, and a top opening extending within the top element between opposed ends of the top wall. The top element is formed from a material that is of a first hardness. The bottle additionally includes a bottom element comprising an end wall, a bottom wall extending around a bottom axis, and a bottom opening extending between the end wall and an opposing end of the bottom wall. The bottom element is formed from a resilient material that is of a second hardness less than the first hardness to facilitate squeezing of the bottom element. The bottom element is connectable to the top element to form a seam therebetween, with the top opening being in communication with the bottom opening when the top element is connected to the bottom element so as to form a reservoir for retaining a liquid. A collar is coupled to the top element and the bottom element, with the collar extending around the seam so as to allow for load transfer between the top element and the bottom element. A cap connectable to the top element and includes a passageway communicable with the reservoir.

The bottom element may be formed of a material that has a Shore A hardness. The bottom element may be formed of a material that has a durometer of 20 or higher. The bottom element may be formed of a material that has a durometer between 35 and 65. The bottom element may be formed from a Thermo Plastic Elastomer material or similar soft material easy to squeeze.

The collar may be melded to both the top element and the bottom element.

The bottle may include a filter positioned within the reservoir for filtering water flowing through the filter. The filter may include a filter support engageable with the top element and at least one filtering element positionable within the filter support. The at least one filtering element may include a NANO filter cartridge having an applied layer of activated carbon. The bottle may further include a pre-filter located upstream of the NANO filter cartridge or may be used as an enclosure around the NANO filter cartridge to filter out sediments in the source water.

The bottom element may be connectable to the top element via snap-fit engagement. The bottom element may be connectable to the top element via threaded engagement.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
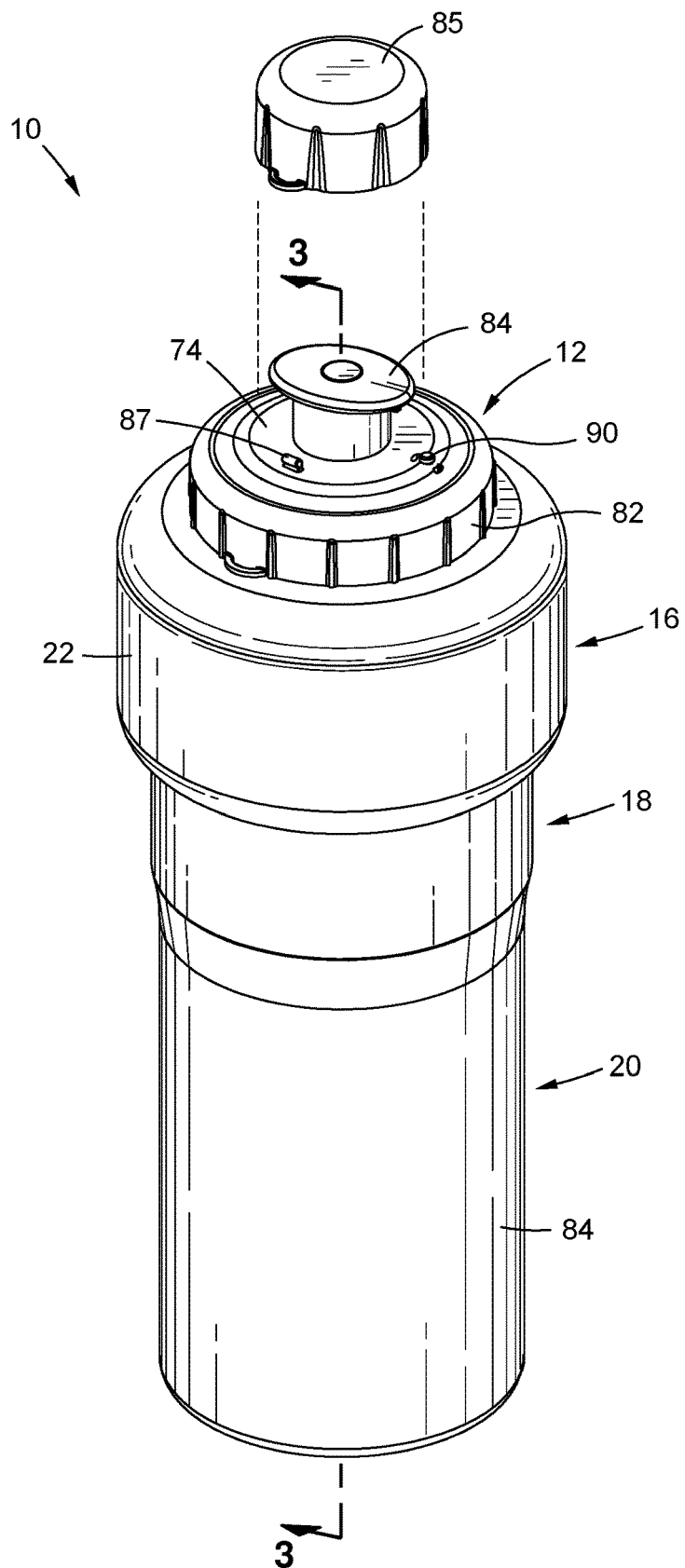
FIG. 1 is an upper perspective view of a hybrid, hand squeezable water filter bottle with a cover being depicted in an exploded position.

The detailed description set forth below in connection with the appended drawings is intended as a description of certain embodiments of a squeezable hybrid water filter bottle having integrated filtration capabilities and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating a preferred embodiment of the present disclosure only, and are not for purposes of limiting the same, there is depicted a squeezable water filter bottle 10 (e.g., drinking bottle) having an integrated water filter to filter water as it flows through the water filter bottle 10 and is dispensed for drinking. The water filter bottle 10 is hybrid in nature being formed of two different materials, with one portion of the water filter bottle 10 being formed from a harder material for providing structural support to the integrated water filter, while another portion of the water filter bottle 10 is formed from a softer, more flexible material to allow a user to more easily squeeze the water filter bottle 10 to generate sufficient fluid pressure to urge the water through the filter. The water filter bottle 10 may be manufactured via a unique and distinctive process to form the water filter bottle 10 from two different materials, as will be described in more detail below. The materials may both be certified to USA FDA certification requirements to prevent endangerment to users. Furthermore, the water filter bottle 10 may be reusable, which may reduce health hazard for human use, reduce environmental pollution and have an impact on saving marine life, as well as other sea and land based birds and animals.

Figure 2:
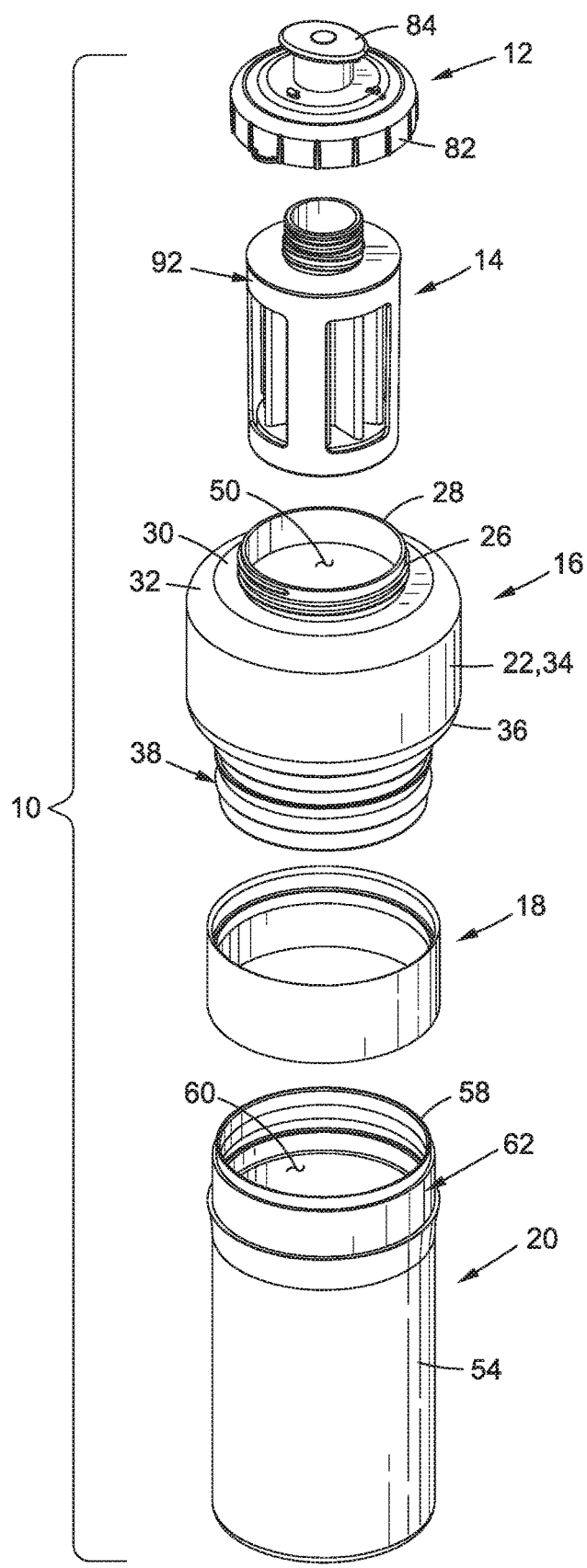
FIG. 2 is an exploded upper perspective view of the hand squeezable water filter bottle depicted in FIG. 1.
Figure 4:
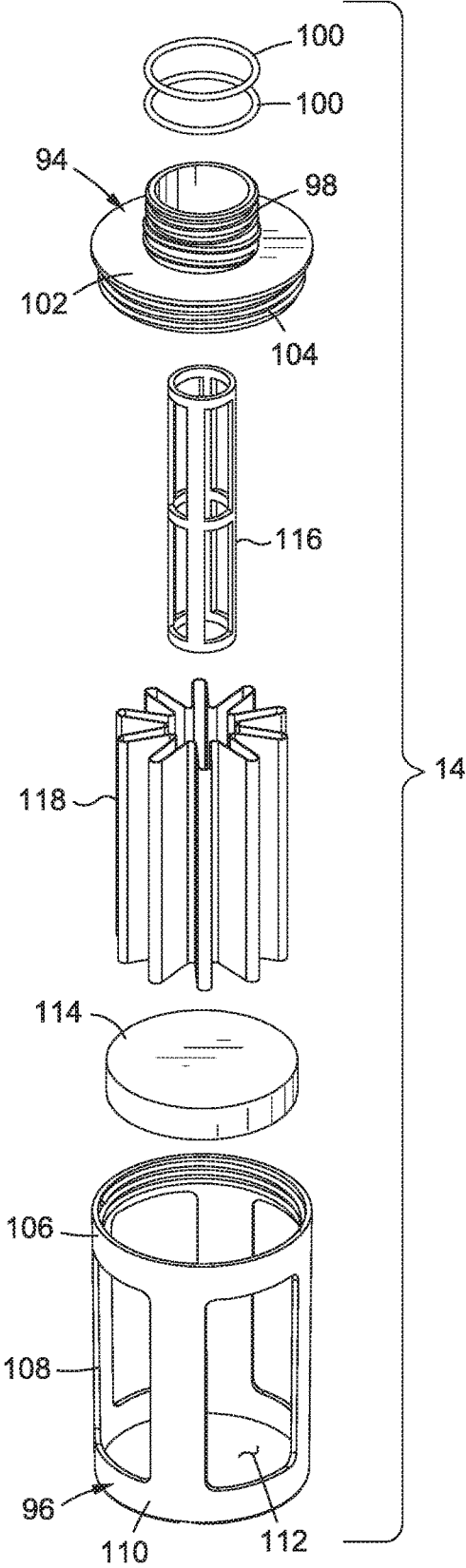
FIG. 4 is an exploded upper perspective view of a filter associated with the hand squeezable water filter bottle.

FIG. 1 is an upper perspective view of an exemplary embodiment of the hybrid water filter bottle 10, while FIG. 2 is an exploded upper perspective view of the water filter bottle 10. The water filter bottle 10 generally includes a cap 12, a filter 14, a top element 16, a collar 18, and a bottom element 20.

The top element 16, collar 18, and bottom element 20 collectively form a hybrid body of the water filter bottle 10. The top element 16 includes a top wall 22 extending around a top axis 24. The top wall 22 includes a first cylindrical segment 26 defining a first end 28. External threads may be formed on the first cylindrical segment 26 to allow for threaded engagement between the top element 16 and the cap 12. A first shoulder 30 extends radially outward from the first cylindrical segment 26 and transitions into a first rounded segment 32. The first rounded segment 32 extends to a main segment 34 having a diameter larger than the first cylindrical segment 26. The main segment 34 is generally cylindrical and extends axially along the top axis 24 between the first rounded segment 32 and a second rounded segment 36 located opposite the first rounded segment 32. The second rounded segment 36 transitions into a top engagement segment 38, which is adapted to interface with the bottom element 20. In this regard, the top engagement segment 38 may be sized and shaped to facilitate cooperative engagement with a corresponding structure on the bottom element 20. In the exemplary embodiment, the top engagement segment 38 is specifically shaped for snap fit engagement with the bottom element 20. In this regard, the top engagement segment 38 includes a first cylindrical portion 40, an angled portion 42, and a second cylindrical portion 44, with the angled portion 42 being located between the first and second cylindrical portion 40, 44. In the exemplary embodiment, the angled portion 42 forms an outer concave cavity, which interfaces with a complimentary outer convex projection on the bottom element 20, as will be described in more detail below. The second cylindrical portion 44 may transition into an inwardly extending flange 46 defining a second end 48.

The top element 16 further includes a top opening 50 extending along the top axis 24 between the opposed ends 28, 48 of the top wall 22. In view of the variable diameter of the top wall 22, the contour of the top opening 50 is also variable. According to one embodiment, the diameter of the top opening 50 is largest at the main segment 34, which is the portion of the top opening 50 where the filter 14 primarily resides, and thus, where water may flow into the filter 14, as will be described in more detail below. Accordingly, the wide diameter of the main segment 34 may be sized to accommodate the filter 14 while also providing a sufficient annular reservoir around the filter 14 for water to gather before flowing into the filter 14.

The bottom element 20 includes an end wall 52 and a bottom wall 54 extending from the end wall 52 around a bottom axis 56 and terminating at an end 58. A bottom opening 60 extends between the end wall 52 and an opposing end 58 of the bottom wall 54. The bottom wall 54 further defines a bottom engagement segment 62 that is complimentary to the top engagement segment 38 of the top element 16. The bottom wall 54 may define an inner diameter and an outer diameter, both of which may be substantially uniform between the end wall 52 and the bottom engagement segment 60. The inner diameter and the outer diameter of the bottom wall 54 may be less than the diameter of the top wall 22 at the main segment 34 thereof.

The bottom engagement segment 62 includes a first cylindrical portion 64, an angled portion 66, and a second cylindrical portion 68, which are complimentary in shape to the first cylindrical portion 40, angled portion 42 and second cylindrical portion 44, respectively, of the top element 16. In this regard, the portions 64, 66, 68 of the bottom engagement segment 62 engage with the corresponding portions 40, 42, 44 of the top engagement element 38. Along these lines, the angled portion 66 of the bottom engagement segment 62 includes a convex protrusion extending radially inward, which is complimentary in shape to the concave cavity defined by the angled portion 42 of the top engagement segment 38.

The bottom element is connectable to the top element to form a seam therebetween, with the top opening being in communication with the bottom opening when the top element is connected to the bottom element so as to form a reservoir for retaining a liquid. In the exemplary embodiment, the bottom wall 54 is sized to receive the top engagement segment 38 of the top element 16 to facilitate connection of the top element 16 to the bottom element 20 via snap-fit engagement. Along these lines, when engaged, the bottom engagement segment 62 may exert a compressive force against the top engagement segment 38 to effectuate the snap-fit engagement.

Figure 6:
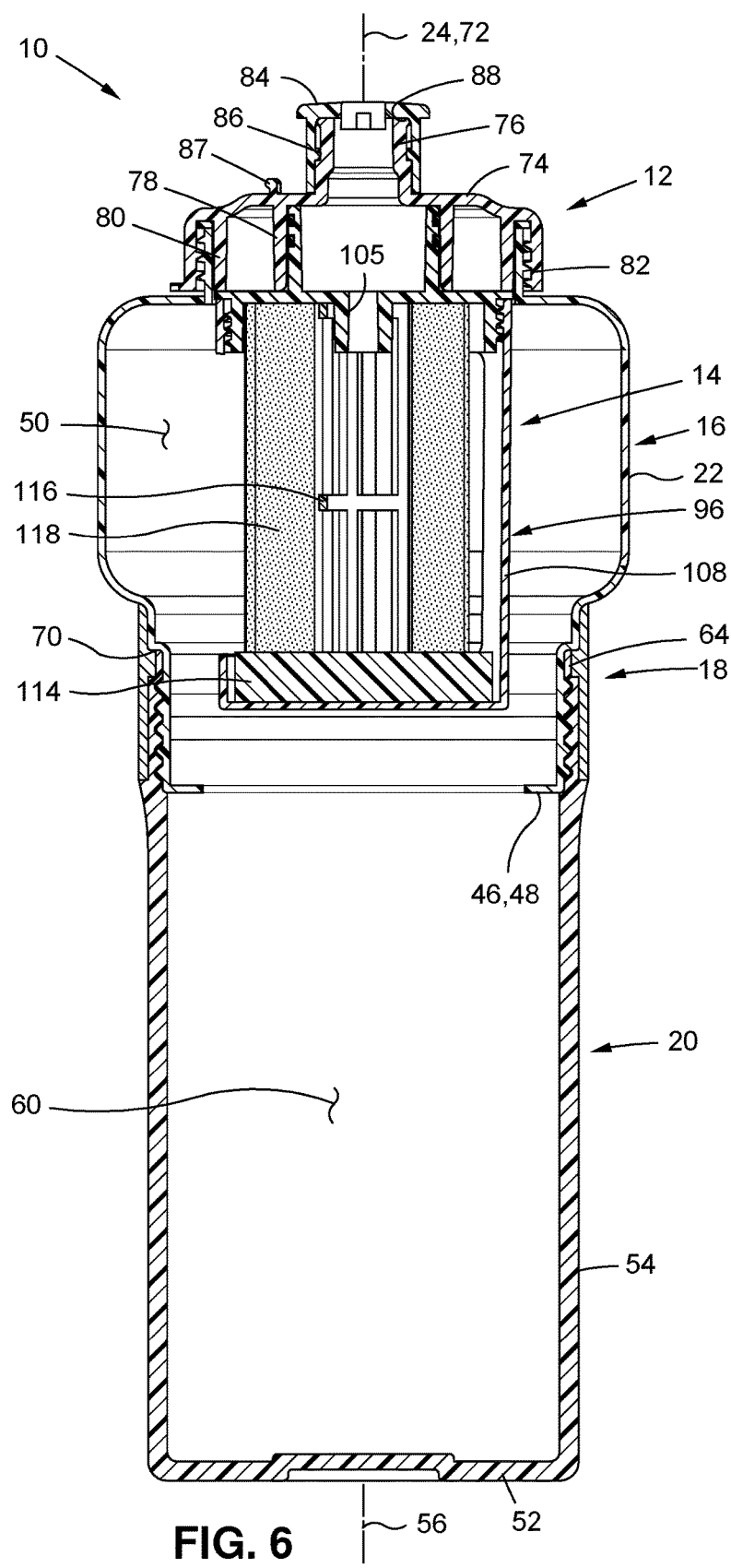
FIG. 6 is a cross sectional view of an embodiment of the hand squeezable bottle in a natural position with the top element being connectable to the bottom element via threaded engagement.
Figure 7:
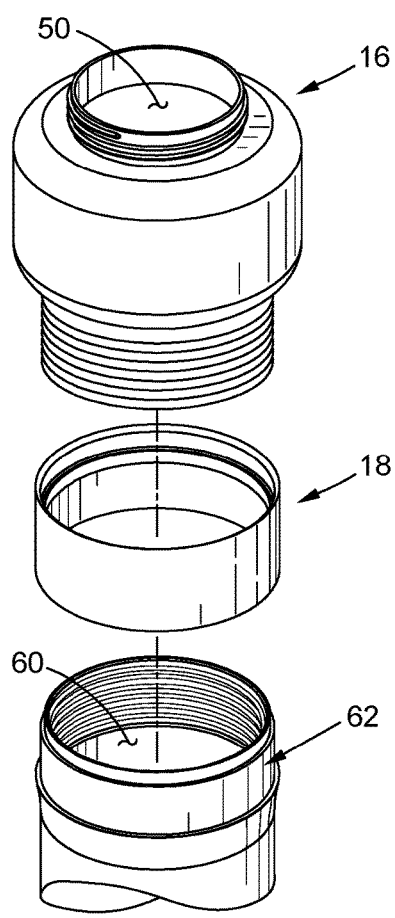
FIG. 7 is a partial exploded upper perspective view of the hand squeezable bottle of FIG. 6.

Although the foregoing describes the top engagement segment 38 and bottom engagement segment 62 as being adapted for snap-fit engagement therebetween, it is understood that the top engagement segment 38 and bottom engagement segment 62 may be sized and structured to be connectable via threaded engagement. Along these lines, as shown in FIGS. 6 and 7, the top engagement segment 38 and bottom engagement segment 62 may include threads to facilitate threaded engagement therebetween. Furthermore, other modes of engagement known in the art may also be used to connect the top element 16 with the bottom element 20 without departing from the spirit and scope of the present disclosure.

According to one embodiment, the top element 16 is formed from a material that is of a first hardness, while the bottom element 20 is formed from a resilient material that is of a second hardness less than the first hardness to facilitate squeezing of the bottom element 20 to generate pressure to cause fluid to flow through a filter and ultimately be dispensed from the water filter bottle 10, as will be described in more detail below. For instance, the top element 16 may be formed from a hard plastic, such as polypropylene, which has a Shore A hardness of approximately 70-85 or higher. Of course, other materials may also be used, such as hard rubbers, metals, etc., without departing from the spirit and scope of the present disclosure. As used herein, the term "hybrid" refers to the two different hardnesses associated with the bottle body.

The bottom element 20 may be formed of a material that has a lower hardness than the top element 16. The material used to form the bottom element 20 may have a durometer that is very low based on the soft squeezability requirements of the application. For instance, in one embodiment, the bottom element material hardness is Shore A and has a durometer of around 20-70, and more specifically, a durometer between 30 and 65. In one embodiment, the bottom element may be formed from a Thermo Plastic Elastomer (TPE) material, certified by USA FDA for food grade applications. Other possible materials are silicone materials, which are of medical grade or food grade, and FDA approved for health and safety. It is understood that other materials known in the art having similar characteristics and capable of similar performance as that discussed above, may be used for fabricating the bottom element 20.

According to one embodiment, the water filter bottle 10 includes the collar 18, which is coupled to the top element 16 and the bottom element 20, with the collar 18 extending around a seam 70 formed at the junction of the top and bottom elements 16, 20. The collar 18 is an annular structure that is sized so as to partially overlap an end portion of the top element 16, as well as an end portion of the bottom element 20. In the exemplary embodiment, the collar 18 overlaps the top engagement segment 38 of the top element 16, and the bottom engagement segment 62 of the bottom element 20. The collar 18 extends around the top axis 24 and bottom axis 56 when the collar 18 is connected to the interconnected top and bottom elements 16, 20. As will be explained in more detail below, the collar 18 may be over-molded onto the top and bottom elements 16, 20, which may result in the collar 18 becoming melded to the top element 16 and the bottom element 20 to form an integral structure. In this regard, the collar 18 may allow for load transfer between the top element 16 and the bottom element 20.

Figure 3:
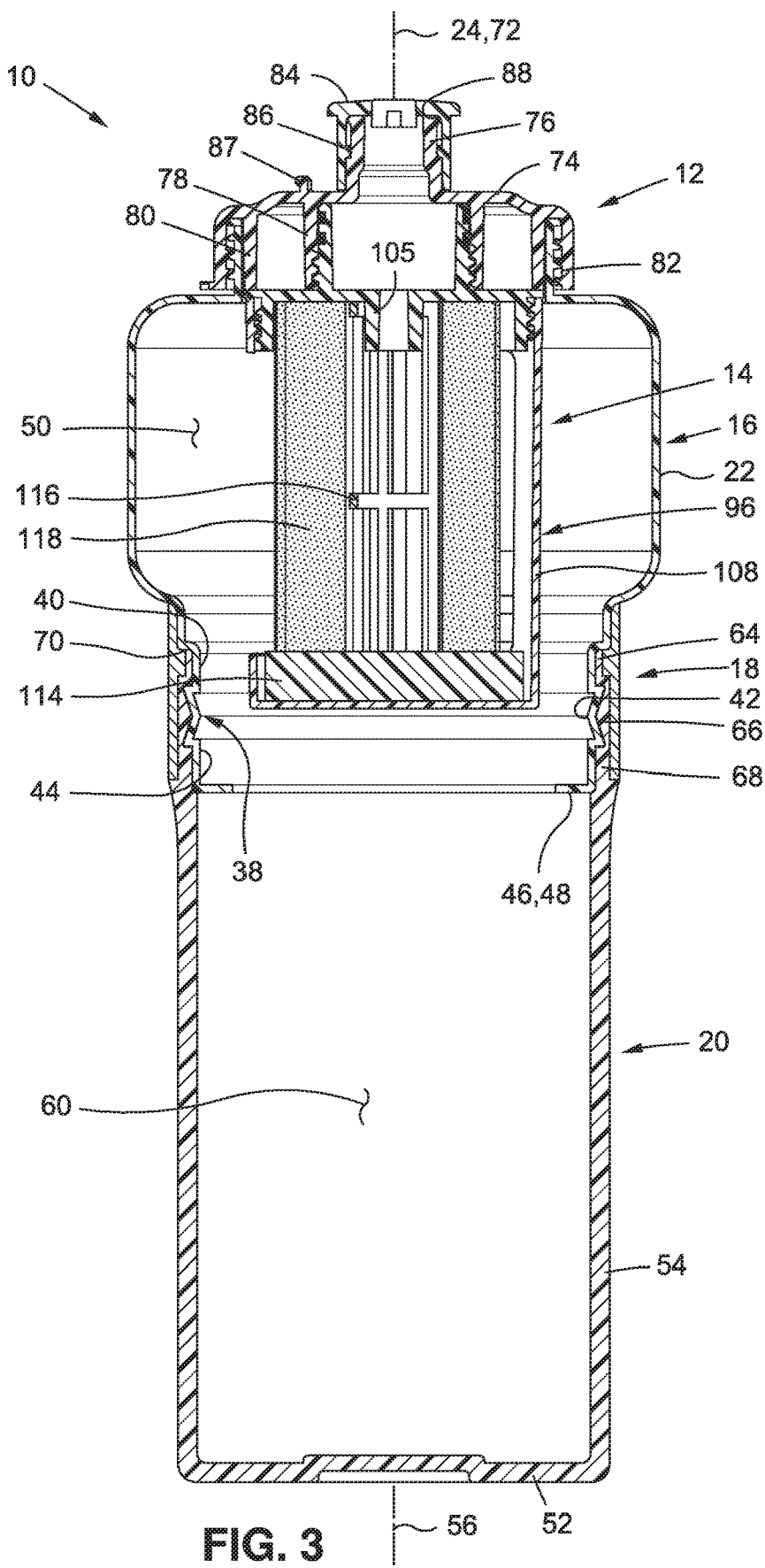
FIG. 3 is a sectional view of the hand squeezable water filter bottle in a natural position.

The bottle 10 may also include a cap 12 connectable to the top element 16 to enclose the reservoir defined by the top and bottom elements 16, 20. The cap 12 may be disposed about a cap axis 72, with the cap 12 including several walls which extend around the cap axis 72. More specifically, the cap 12 may include a top wall 74 extending about the cap axis 72 in generally transverse relation thereto. A first wall 76 extends from the top wall 74 in a first direction (i.e., upwardly from the perspective depicted in FIG. 3). Several walls may extend from the top wall 74 in a second direction, opposite to the first direction. In particular, an inner wall 78, an intermediate wall 80, and an outer wall 82, each extend around the cap axis 72, and are radially spaced apart from each other. The outer wall 82 may include internal threads to engage with the first cylindrical segment 26 of the top element. The inner wall 78 and intermediate wall 80 may be sized and structured to interface with a filtering element, as will be described in more detail below.

The cap 12 may additionally include a closure member 84 operatively connected to the first wall 76, with the closure member 84 being selectively transitional between a closed position and an open position. In the open position, the closure member 84 and the first wall 76 collectively define a passageway through which fluid may flow. Conversely, in the closed position, the closure member 84 and the first wall 76 collectively close the passageway to prevent fluid from flowing therethrough. The closure member 84 may be translatable along the cap axis 72 between the closed position (shown in FIG. 3) and the open position (shown in FIG. 5). The closure member 84 and the first wall 76 may be structured to mitigate inadvertent removal of the closure member 84 from the first wall 76 as the closure member 84 is transitioned to the open position. In particular, the closure member 84 may include a tab 86 projecting radially inward, which interfaces with a flange 88 projecting radially outward from the first wall 76. A cover 85 may be used to selectively cover the closure member 84, with the cover 85 being snap-fit engageable with projections 87 formed on the top wall 74.

The cap may additionally include an air inlet valve 90 coupled thereto to allow air to flow into the bottle 10 to facilitate transition of the bottle 10 from a compressed configuration to a natural configuration. The air inlet valve 90 includes an opening formed in the top wall 74, and a valve body extending within the opening. The air inlet valve 90 is transitional relative to the top wall 74 between a closed position and an open position. In the closed position, the valve body interfaces with the top wall 74 to effectively close the opening to prevent fluid, including air, from flowing therethrough. In the open position, the valve body is positioned so as to allow fluid to flow through the opening. The valve body may be biased toward the closed position, and may be transitioned to the open position when there is a negative pressure or vacuum within the bottle 10 capable of overcoming the biasing force and urging the valve body toward the closed position. Once a sufficient amount of air has entered the bottle 10 through the opening to reduce the negative pressure and reduce the magnitude of the vacuum, the biasing force may urge the valve body toward the closed position.

As noted above, the bottle 10 may include integrated water filtration capabilities. To that end, the bottle 10 may include a filter 14 positioned within the reservoir for filtering water flowing through the filter for drinking by the user. The filter 14 may include a filter support 92 engageable with the top element 16 and at least one filtering element positionable within the filter support 92. The filter support 92 includes an upper support element 94 and a lower support element 96 engageable with each other via cooperating threads. The upper support element 94 includes a threaded neck 98 that threadedly engages with the cap 12. The threaded engagement between the upper support element 94 and the cap 12 allows the filter to be suspended from the cap within the reservoir. One or more o-rings 100 may be positioned between the threaded neck upper support element 94 and the cap 12 to ensure a fluid tight seal is formed therebetween.

Extending radially outward from the threaded neck 98 is a primary wall 102. An externally threaded cylindrical wall 104 extends from the primary wall 102, with the neck 98 and cylindrical wall 104 extending from opposed sides of the primary wall 102. According to one embodiment, the cylindrical wall 104 defines an inner and outer diameters larger than the inner and outer diameters of the neck 98. An outlet wall 105 extends from the primary wall 102 and defines an outlet opening through which filtered liquid may flow.

The externally threaded cylindrical wall 104 engages with the lower support element 96, which includes an internally threaded first end portion 106. A plurality of support ribs 108 extend axially between the first end portion 106 and an opposing second end portion 110. The ribs 108 are spaced apart from each other to provide several openings 112 around the circumference of the lower support element 96 to provide a space for water to flow through. The openings 112 and ribs 108 may also function as a pre-filtering element capable of preventing large sediments to flow therethrough toward an inner filtering element. Furthermore, a screen or other sediment filter may be wrapped around the filter support 92.

Positioned within the filter support 92 is at least one filtering element. The exemplary embodiment includes a filter base 114, a filter core 116 and an outer filter 118, with the filter core 116 being positioned within the outer filter 118. The outer filter 118 may be a pleated NANO filter, which includes a membrane having nanometer sized pores formed within the membrane. According to one particular implementation, the pore sizes may range for 1-15 nanometers, although other sizes may be used without departing from the spirit and scope of the present disclosure. The membrane may be formed using space age material or other materials known in the art. Using a special process, the NANO filter is coated with a layer of granular activated carbon. The outer filter 118 may be glued, adhered, or otherwise secured to the upper support element 94 on one end, and glued, adhered, or otherwise secured to the filter base 114 on the other end. The filter core 116 resides within the outer filter 118 and may provide strength to the outer filter 118. In this regard, during use, water is urged into the outer filter 118 in a radially inward direction, which may cause the outer filter 118 to collapse if not supported by the filter core 116.

The unique structural attributes of the water filter bottle 10, specifically, flexibility of the bottle element 20 and the strength of the top element 16 may be the result of a unique method of forming the water filter bottle 10. According to one embodiment, the method includes connecting the top element 16 to the bottom element 20 to form the seam 70 therebetween. The top and bottom elements 16, 20 may be connected via snap-fit engagement, threaded engagement, or other ways of connecting the top and bottom element 16, 20 known in the art. The top opening 50 defined by the top element 16 is in communication with the bottom opening 60 when the top element 16 is connected to the bottom element 20 so as to form a reservoir for retaining a liquid, such as water.

The method further includes forming the collar 18 around the seam 70. In one embodiment, the collar 18 is formed by over-molding the collar 18 around the seam 70. In this regard, such over-molding may be achieved by placing the connected top element 16 and bottom element 20 in a mold, and injecting a material into the mold for forming the collar 18 around the connected top element 16 and bottom element 20 at the seam 70.

According to one embodiment, the collar 18 is formed around the seam 70 in a manner which results in the collar 18 being bonded to both the top element 16 and the bottom element 20. When the collar 18 over-molded around the top element 16 and the bottom element 20, the over-molding may result in a portion of the collar 18 melding with the top element 16 and/or the bottom element 20. In this regard, a portion of the top element 16 and/or the bottom element 20 may melt during molding of the collar 18, such that when the parts cool, the collar 18 is joined with the top element 16 and or the bottom element 20. This may result in the formation of a chemical bond between the collar 18 and the top and bottom elements 16, 20. Moreover, the melding of the collar 18 to the top and bottom elements 16, 20 may strengthen the connection therebetween, and may result in the formation of an integral structure. The collar 18 may be formed from TPE or other suitable material for over-mold application.

Once the collar 18 is formed around the top and bottom elements 16, 20, resulting in the formation of the body of the bottle, the method may include placing the filter 14 within the reservoir. In particular, the filter support 92 may be initially connected to the cap 12. Subsequently, the cap 12 may be moved toward the top element 16, with the filter 14 aligned with the top opening 50, and then advanced into the top opening 50. The cap 12 is then screwed onto the top element 16 to suspend the filter 14 within the reservoir. Over course, bottle 10 may be filled with liquid prior to placing the cap 12 on the top element 16.

Figure 5:
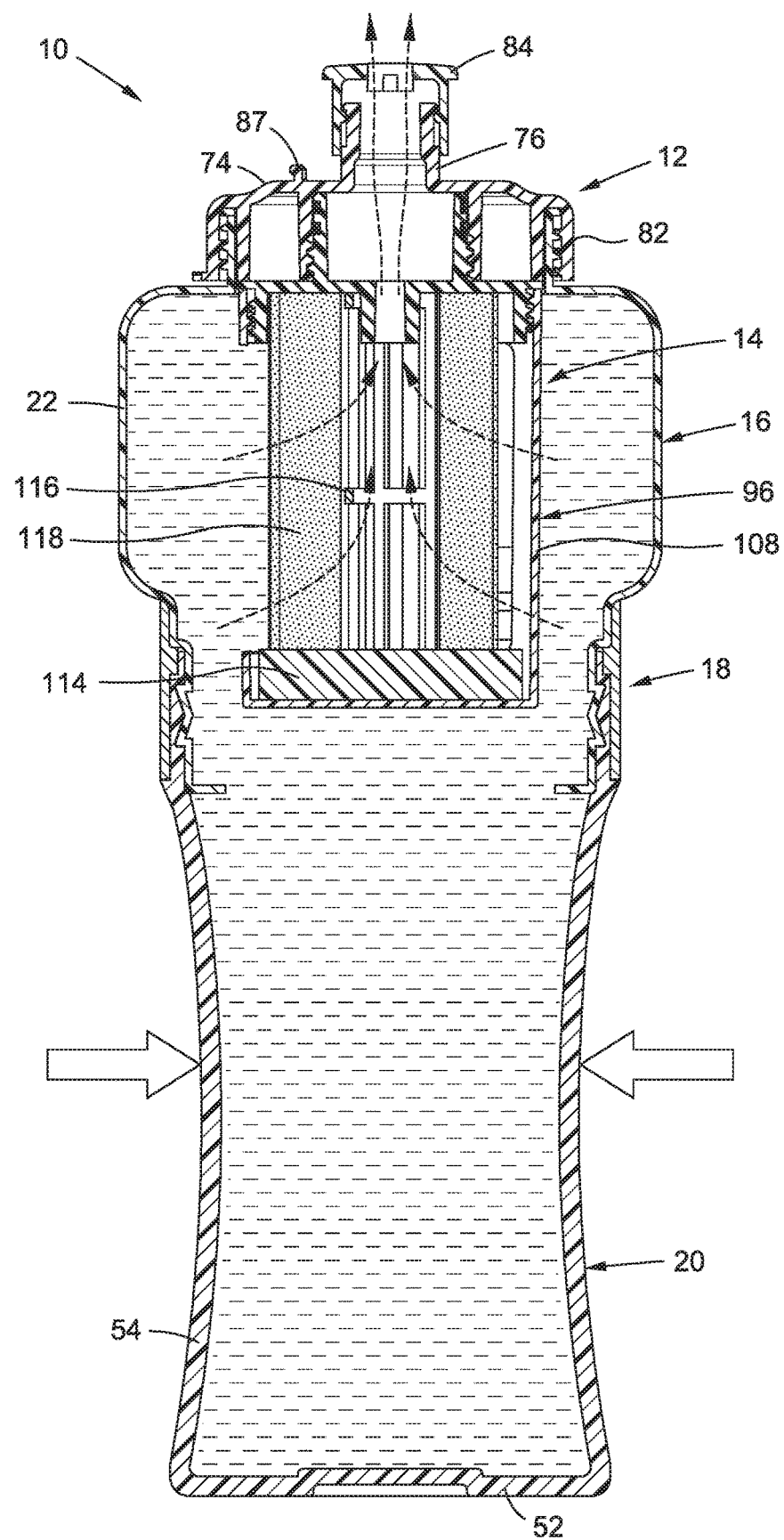
FIG. 5 is a sectional view of the hand squeezable water filter bottle filled with water and depicted in a compressed position.

During use of the bottle, a user transitions the closure member 84 on the cap 12 to the open position, and the user places its mouth in alignment with the closure member 84. The user then squeezes the bottom element 20 to cause the bottom element 20 to transition from a neutral configuration toward a compressed configuration to generate pressure within the bottle 10. FIG. 5 shows one example of the bottom element 20 being squeezed, with opposed portions of the bottom element 20 being pressed toward each other. The increased internal pressure causes liquid to flow radially inward through the sediment filter wrapped around rib 108 and opening 112. This filters out sediments present in the source water. The water then flows through the outer filter 118, such that impurities within the liquid are removed as the liquid passes through the outer filter 118. The filtered liquid then exits the filter by passing through the outlet opening defined by the outlet wall 105 and then flows out of the bottle 10 around the closure member 84.

Once the liquid has exited the bottle 10, the user eases the grip on the bottle 10 to allow the bottle 10 to transition from the compressed configuration toward the neutral configuration. The internal resiliency bottom element 16 urge the bottom element 16 toward the neutral configuration. Such biasing force, along with the pressure differential between the negative pressure inside the bottle 10 and the ambient pressure outside of the bottle 10 causes the air inlet valve 90 to transition to its open position, to allow air to flow into the bottle 10 to fill the void created by the liquid which was squeezed out of the bottle 10.

The bottle 10 may address many deficiencies associated with conventional water bottles. Along these lines, certain filters have been previously used which used iodine to kill bacteria. However, such filters were harmful for pregnant women, children, and other suffering from health problems, and thus, such filters may be used only in emergency situations, such as flooding, where drinking water may be contaminated with sewer water. The filter 14 used in the bottle 10 described herein does not use iodine, and thus, may be safely used universally.

Furthermore, the use of a soft, flexible material allows the bottle 10 to be squeezed using less effort than some conventional bottles, particularly those formed from low density polyethylene (LDPE) or similar material. Accordingly, the bottle 10 may find particular ease of use for everyone, including women, children, and those suffering from health conditions.

A major advantage of the filter attachment as explained above is that the filter used is a replaceable filter. Once the specified life of the filter is reached, as may be indicated by user instructions, the filter assembly with sediment filter may be removed easily and replaced with another filter assembly. The new filter assembly may provide an additional specified amount of filtered water until such filter assembly reaches end of life, at which point another replaceable filter assembly may be used. The body of the water filter bottle 10 remains reusable, until replacement may be deemed necessary by the user.

The bottle 10 may also be reusable, and thus, may be used for an extended period of time, such as several months or even years. As such, the bottle 10 is much more environmentally friendly than disposable water bottles which may be intended for only one-time use. Accordingly, use of the bottle 10 may reduce plastic pollution and have a positive impact on the environment, impact on marine ecosystem etc.

Although it is contemplated that the bottle 10 may be particularly advantageous for use with advanced filter media, it is contemplated that the bottle 10 may be used without the filter 10. The bottle's comfort and ease of dispensing a liquid may cause a user to use the bottle 10 with other drinks which may not require filtering. Such drinks may include pre-filtered water, sports performance drinks, juices, etc. Moreover, the bottle 10 may be made available in several different sizes, including 1000 ml, 750 ml or 500 ml. In this regard, the bottle 10 may be held-held during use.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A hybrid, hand squeezable drink bottle comprising:
a top element comprising a top wall extending around a top axis, and a top opening extending within the top element between opposed ends of the top wall, the top element being formed from a material that is of a first hardness;
a bottom element comprising an end wall, a bottom wall extending around a bottom axis, and a bottom opening extending between the end wall and an opposing end of the bottom wall, the bottom element being formed from a resilient material that is of a second hardness less than the first hardness to facilitate squeezing of the bottom element, the bottom element being connectable to the top element to form a seam therebetween, the top opening being in communication with the bottom opening when the top element is connected to the bottom element so as to form a reservoir for retaining a liquid;

a collar coupled to the top element and the bottom element and extending around the seam so as to allow for load transfer between the top element and the bottom element; and a cap connectable to the top element and having a passageway communicable with the reservoir;

the top element being configured to include an exposed outer surface when the cap is connected to the top element.

2. The hybrid, hand squeezable drink bottle recited in claim 1, wherein the bottom element is formed of a material that has a Shore A hardness.

3. The hybrid, hand squeezable drink bottle recited in claim 2, wherein the bottom element is formed of a material that has a durometer of 20 or higher.

4. The hybrid, hand squeezable drink bottle recited in claim 1, wherein the top element is formed of a material that has a durometer of 70 or higher.

5. The hybrid, hand squeezable drink bottle recited in claim 1, wherein the bottom element is formed from a Thermo Plastic Elastomer material.

6. The hybrid, hand squeezable drink bottle recited in claim 1, wherein the collar is melded to both the top element and the bottom element.

7. The hybrid, hand squeezable drink bottle recited in claim 1, further comprising a filter positioned within the reservoir for filtering water flowing through the filter.

8. The hybrid, hand squeezable drink bottle recited in claim 7, wherein the filter includes a filter support positionable within the top element and at least one filtering element positionable within the filter support.

9. The hybrid, hand squeezable drink bottle recited in claim 7, further comprising a pre-filtering element in fluid communication with the filter.

10. The hybrid, hand squeezable drink bottle recited in claim 1, wherein the bottom element is connectable to the top element via snap-fit engagement.

11. The hybrid, hand squeezable drink bottle recited in claim 1, wherein the bottom element is connectable to the top element via threaded engagement.

12. The hybrid, hand squeezable drink bottle recited in claim 1, wherein the top element and the bottom element are coupled to the collar such that the top element and bottom element extend from the collar in opposite directions.

13. A hybrid, hand squeezable drink bottle comprising:

a top element comprising a top wall extending around a top axis, and a top opening extending within the top element between opposed ends of the top wall, the top element being formed from a material that is of a first hardness;

a bottom element comprising an end wall, a bottom wall extending around a bottom axis, and a bottom opening extending between the end wall and an opposing end of the bottom wall, the bottom element being formed from a resilient material that is of a second hardness less than the first hardness to facilitate squeezing of the bottom element, the bottom element being connectable to the top element to form a seam therebetween, the top opening being in communication with the bottom opening when the top element is connected to the bottom element so as to form a reservoir for retaining a liquid;

a filter positioned within the reservoir for filtering water flowing through the filter; and a cap connectable to the top element and having a passageway communicable with the reservoir;

the top element being configured to include an exposed outer surface when the cap is connected to the top element.

14. The hybrid, hand squeezable drink bottle recited in claim 13, wherein the filter includes a filter support positionable within the top element and at least one filtering element positionable within the filter support.

15. The hybrid, hand squeezable drink bottle recited in claim 13, further comprising a pre-filtering element located upstream of the filter.

16. The hybrid, hand squeezable drink bottle recited in claim 13, wherein the bottom element is formed of a material that has a Shore A hardness.

17. The hybrid, hand squeezable drink bottle recited in claim 16, wherein the bottom element is formed of a material that has a durometer of 20 or higher.

18. The hybrid, hand squeezable drink bottle recited in claim 13, wherein the top element is formed of a material that has a durometer of 70 or higher.

19. The hybrid, hand squeezable drink bottle recited in claim 13, wherein the bottom element is formed from a Thermo Plastic Elastomer material.

20. A hybrid, hand squeezable drink bottle comprising:

a top element comprising a top wall extending around a top axis, and a top opening extending within the top element between opposed ends of the top wall, the top element being formed from a material that is of a first hardness;

a bottom element comprising an end wall, a bottom wall extending around a bottom axis, and a bottom opening extending between the end wall and an opposing end of the bottom wall, the bottom element being formed from a resilient material that is of a second hardness less than the first hardness to facilitate squeezing of the bottom element, the bottom element being connectable to the top element to form a seam therebetween, the top opening being in communication with the bottom opening when the top element is connected to the bottom element so as to form a reservoir for retaining a liquid;

a collar melded to both the top element and the bottom element and extending around the seam so as to allow for load transfer between the top element and the bottom element; and a cap connectable to the top element and having a passageway communicable with the reservoir.

\* \* \* \* \*